(12) United States Patent
Sippel

(10) Patent No.: US 10,671,664 B2
(45) Date of Patent: Jun. 2, 2020

(54) METHOD AND DEVICE FOR MANUFACTURING OBJECTS HAVING IMPROVED SURFACE CHARACTERISTIC

(71) Applicant: EOS GmbH Electro Optical Systems, Krailling (DE)

(72) Inventor: Dominik Sippel, München (DE)

(73) Assignee: EOS GmbH Electro Optical Systems, Krailling (DE)

( * ) Notice: Subject to any disclaimer, the term of this patent is extended or adjusted under 35 U.S.C. 154(b) by 20 days.

(21) Appl. No.: 15/619,730

(22) Filed: Jun. 12, 2017

(65) Prior Publication Data

US 2017/0357671 A1 Dec. 14, 2017

(30) Foreign Application Priority Data

Jun. 14, 2016 (DE) .......................... 10 2016 210 538

(51) Int. Cl.
| | |
|---|---|
| *G06F 16/583* | (2019.01) |
| *B22F 3/00* | (2006.01) |
| *G05B 19/4097* | (2006.01) |
| *B33Y 10/00* | (2015.01) |
| *B33Y 50/02* | (2015.01) |
| *G06F 17/10* | (2006.01) |
| *G06F 119/18* | (2020.01) |

(52) U.S. Cl.
CPC ............ *G06F 16/5862* (2019.01); *B22F 3/00* (2013.01); *B33Y 10/00* (2014.12); *B33Y 50/02* (2014.12); *G05B 19/4097* (2013.01); *G06F 17/10* (2013.01); *G06F 2119/18* (2020.01); *Y02P 90/265* (2015.11)

(58) Field of Classification Search
None
See application file for complete search history.

(56) References Cited

U.S. PATENT DOCUMENTS

| | | | | |
|---|---|---|---|---|
| 2003/0012978 A1* | 1/2003 | Sodani | ...................... | B24C 1/06 428/659 |
| 2003/0218607 A1* | 11/2003 | Baumberg | .............. | G06T 15/20 345/419 |
| 2007/0269080 A1* | 11/2007 | Hamanaka | ......... | G06K 9/00241 382/106 |
| 2010/0111364 A1* | 5/2010 | Iida | .................... | G06K 9/00214 382/103 |
| 2014/0114457 A1 | 4/2014 | McDowell et al. | | |

(Continued)

*Primary Examiner* — Ziaul Karim
(74) *Attorney, Agent, or Firm* — Seyfarth Shaw LLP

(57) ABSTRACT

A computer-based method of providing control commands of a control command set for manufacturing a three-dimensional object with an additive manufacturing device. The method includes at least the following steps: a step of allocating input data that represent at least a partial surface of the object to be manufactured, where the partial surface has an initial surface texture defined by a set of initial texture parameter values that characterize the geometry of the initial surface texture; a step of determining a set of target texture parameter values that differ from the set of initial texture parameter values, and a step of generating control commands of a control command set to manufacture the partial surface by the additive manufacturing device with a surface texture that is defined by the set of target texture parameter values.

15 Claims, 12 Drawing Sheets

(56) References Cited

U.S. PATENT DOCUMENTS

| | | | |
|---|---|---|---|
| 2014/0255647 A1* | 9/2014 | Johnson | B33Y 10/00 |
| | | | 428/118 |
| 2014/0279177 A1 | 9/2014 | Stump | |
| 2015/0036174 A1* | 2/2015 | Pettis | G06F 3/1288 |
| | | | 358/1.15 |
| 2015/0057982 A1* | 2/2015 | Erdman | G06F 17/50 |
| | | | 703/1 |
| 2015/0142153 A1* | 5/2015 | Chun | B29C 64/40 |
| | | | 700/98 |
| 2015/0324490 A1 | 11/2015 | Page | |
| 2016/0167131 A1 | 6/2016 | Weilhammer et al. | |
| 2016/0271881 A1* | 9/2016 | Bostick | G05B 15/02 |
| 2017/0129187 A1* | 5/2017 | Hashimoto | B29C 64/00 |

* cited by examiner

ND DEVICE FOR
METHOD AND DEVICE FOR MANUFACTURING OBJECTS HAVING IMPROVED SURFACE CHARACTERISTIC

TECHNICAL FIELD OF THE INVENTION

The invention refers to a method of manufacturing a three-dimensional object by means of an additive manufacturing device as well as to the corresponding device. In particular, the invention refers to a computer-based method of providing control commands of a control command set for manufacturing a three-dimensional object by means of an additive manufacturing device as well as to a corresponding preprocessor device.

BACKGROUND OF THE INVENTION

Additive manufacturing methods such as laser sintering or melting or stereolithography are excellently suited for a quick development of prototypes ("rapid prototyping"), which is the reason why such methods originally were applied in this field.

A development cycle for a product usually starts with a first design of a CAD model of the product, by which design the geometry (outer shape) of the product is defined. Then, having knowledge of the material used for the product (object) the expected properties of the product can be simulated based on the model. Based on the findings from the simulation the CAD model can be changed.

In the development process it is not only the outer shape of an object and the material that is used that have an effect on the properties of an object. The inner structure (e.g. hollows) and the surface similarly do have an influence on the product properties. Particularly the interaction of an object with its surrounding often depends in particular on the object surface. For example, for sanitary ware there is a trend of providing the sanitary ware with a dirt-repellant surface ("lotus effect"). A further example is a structured golf ball surface, which influences the flight characteristics of a golf ball, e.g. the (air) drag coefficient. Moreover, the ride performance of watercrafts, in particular surfboards, is substantially influenced by the interaction of the surfaces coming into contact with the water. Finally, also the haptics when touching an object as well as its appearance (for example when light is reflected) are predominantly influenced by the structure of the surface.

Recent research results show that optimized sliding properties in fluids are made possible by structured surfaces instead of smooth surfaces. Here, there is a large bandwidth of requirements for the fluid mechanics of the surface. Coming back to fins at watercrafts, the optimized surface texture depends for example on the field of application. Thus, the frequency of waves, the amount of algae in the water and the type of flow (very turbulent or almost laminar) will lead to different requirements for the flow characteristics. A further example are rotor blades of a ship's screw, which, depending on the conditions of use, should be optimized such that noise and energy needs are reduced or the steering behavior is improved.

SUMMARY OF THE INVENTION

With respect to the implementation of desired surface textures, a problem arises from the fact that in conventional methods for manufacturing products such as injection molding methods or laminating processes using carbon and glass fibers the required surface textures for obtaining the desired interaction of the surface with its surrounding are not always realizable.

Therefore, it is an object of the present invention to provide a method and a device, by which control parameters for manufacturing products with desired surface interaction characteristics can be provided in a simple way. Furthermore, a method and a device for manufacturing products with improved surface interaction characteristics shall be provided.

The object is achieved by a computer-based method of providing control commands of a control command, a preprocessor device for an additive manufacturing device, a method of manufacturing a three-dimensional object, a device for carrying out an additive manufacturing method, or a computer program, for example.

According to the invention a computer-based method of providing control commands of a control command set for manufacturing a three-dimensional object by means of a layer-wise additive manufacturing device comprises at least the following steps:

- a step of allocating input data that represent at least a partial surface of the object to be manufactured, wherein the partial surface has an initial surface texture, which is defined by a set of initial texture parameter values that characterize the geometry of the initial surface texture,
- a step of determining a set of target texture parameter values that differ from the set of initial texture parameter values, and
- a step of generating control commands of a control command set, by which control commands said partial surface can be manufactured by means of said additive manufacturing device with a surface texture that is defined by the set of target texture parameter values.

According to the invention the shape and the surface texture of an object to be manufactured are decoupled from each other. Thereby it becomes possible to manufacture totally new objects that have combinations of shape and surface texture not yet known up to now. In this way objects can be obtained, which by their shape and surface texture are ideally adapted to an interaction with their surrounding such as an interaction with a fluid flowing around the object.

Preferably, a set of preferential texture parameter values is provided as part of the input data, which preferential texture parameter values characterize a preferential surface texture of the partial surface. In particular, the set of preferential texture parameter values may be determined to be the set of target texture parameter values. Thereby, a desired texture for an object to be manufactured can be specifically defined and such object can be manufactured with the partial surface having the desired texture.

If a set of preferential texture parameter values is provided as part of the input data the method of providing control commands can be modified such that it comprises the following steps:

- a step of comparing said set of preferential texture parameter values with different sets of existing texture parameter values and of determining that set of existing texture parameter values, which has the smallest difference to said set of preferential texture parameter values,
  wherein an existing control command set of an additive manufacturing device is assigned to each of the sets of existing texture parameter values, by which existing control command set the partial surface can be manufactured by means of the additive manufacturing device with a surface texture that is defined by the corresponding set of existing texture parameter values, a step of generating control commands for a control command set, in that either that existing control command set is determined as control command set for manufacturing the object that is assigned to the set of existing texture parameter values that was identified in the comparison step as having the smallest difference, or, in case this existing control command set comprises only those control commands that contain the information for geometrically describing the surface texture that is characterized by the identified set of existing texture parameter values, providing these control commands for an integration into a complete control command set.

By such a modification of the method it is possible to make sure in a simple way that in a case, in which there is no experience with the desired texture, the object is manufactured with a texture that comes as close as possible to the desired texture. In particular, for the comparison of the set of preferential texture parameter values with different sets of existing texture parameter values a database can be accessed, in which database a control command set is assigned to each set of existing texture parameter values. The database contents is for example the result of previous test series, in which by a large number of tests a connection is established between different combinations of texture parameter values and control command sets. Due to the use of a database it is possible to carry out time-consuming examinations, which texture parameter values can be obtained with which control command set, already in advance. This leads to an enormous gain of time when a real object shall be manufactured, because all necessary test series have already been finished. Alternatively, or in addition to a database in which the above-explained test results are stored, a database can be used that has been fed with simulation results from a computing algorithm.

Preferably, by the following steps the set of target texture parameter values is determined and control commands for the control command set are generated:

a step of determining a set of interaction parameter values having a number of components, wherein a value for an interaction parameter is assigned to each component and an interaction parameter characterizes an interaction of the at least one partial surface of the object to be manufactured with its surrounding, a step of comparing said set of interaction parameter values with different sets of existing interaction parameter values and of determining that set of existing interaction parameter values that has the smallest difference to the set of interaction parameter values, wherein a set of texture parameter values is assigned to each set of existing interaction parameter values, wherein an existing control command set of an additive manufacturing device is assigned to each of the sets of existing interaction parameter values, by which existing control command set said partial surface can be manufactured by means of the additive manufacturing device with a surface texture that is defined by the set of texture parameter values assigned to that set of existing interaction parameter values, a step of generating control commands for a control command set, in that the existing control command set that is assigned to the set of existing interaction parameter values having the smallest difference, which was identified in the comparison step, either is set as control command set for manufacturing the object or, in case this existing control command set comprises only those control commands that contain information for a geometrical description of the surface texture that is characterized by the set of texture parameter values which is assigned to the set of existing interaction parameter values identified in the comparison step, providing these control commands for an integration into a complete control command set.

By this preferred embodiment of the method according to the invention it is possible to quickly find a control command set that is able to realize an object having a texture with surface interaction properties coming as close as possible, even if there is not yet experience for the manufacturing thereof. Of course, the result can also be a control command set with which the given texture can be exactly realized. In this case, however, one gets at least a confirmation that the set of preferential texture parameter values was already optimal with respect to the interaction properties. In particular, for the comparison of the set of interaction parameter values with different sets of existing interaction parameter values a database can be accessed, in which database a control command set is assigned to each set of existing interaction parameter values. The database contents is the result of previous test series, in which by means of a large number of tests a connection was made between different combinations of interaction parameter values and control command sets. Due to the use of a database it is possible to carry out time-consuming examinations, which interaction parameter values can be realized with which control command set, already in advance. This leads to an enormous gain of time when an actual object shall be manufactured, because all necessary test series have already been finished.

In a variation of the preferred embodiment in the step of determining a set of interaction parameter values there is an assignment of interaction parameter values to components of said set of interaction parameter values, preferably to all components, which interaction parameter values are identified, preferably by simulation, for an interaction of the initial surface texture with its surrounding. In another variation of the preferred embodiment in said step of determining a set of interaction parameter values there is an assignment of interaction parameter values to components of said set of interaction parameter values, preferably to all components, which interaction parameter values are identified, preferably by simulation, for an interaction of the preferential surface texture with its surrounding.

In particular, the method according to the invention does not aim at a reproduction as exact as possible of a surface texture in the original CAD model describing the (partial) surface. Also the method according to the invention does not aim at a desired texture, which possibly can only be realized with limitations. Rather, by the method according to the invention the realization of an object becomes possible, which has a (partial) surface that has the desired interaction properties with the surrounding as exactly as possible. Even if by the provided control command set the (partial) surface of the object manufactured by the additive manufacturing device has a different texture than the one in the CAD model, this does not play a role. The idea of the invention is not merely manufacturing the given CAD model of an object as exactly as possible, but rather going one step further and manufacturing an object, in which the desired properties of the object are realized as exactly as possible.

In a further variation of the preferred embodiment interaction parameter values are assigned to the components of said set of interaction parameter values, preferably to all components, via a user input. In this way a user can specify the properties of an object desired by him and a set of texture parameter values and a control command set for manufacturing the object with the respective surface texture that implements the desired properties are automatically provided.

In particular, said set of interaction parameter values is subjected to an optimization procedure based on a user input and/or an automatic optimization algorithm before said comparison with the sets of existing interaction parameter values.

It may occur that the interaction parameter values that have been found for an interaction of the initial surface texture or a desired texture with its surrounding differ from the intended interaction parameter values. In such a case the interaction parameters can be adapted again in order to obtain a better adaptation of the provided control command set to the desired interaction properties.

Further preferably, after said set of existing interaction parameter values, which has the smallest difference to the set of interaction parameter values, has been identified, the identified set of existing interaction parameter values is subjected to an optimization procedure based on a user input and/or an automatic optimization algorithm and said comparison set is again executed with the resulting set of interaction parameter values. Thereby, the texture of the object to be manufactured can be optimized step by step for achieving optimal interaction properties.

If said set of interaction parameter values and said sets of existing interaction parameter values have more than one component, preferably the difference of a set of existing interaction parameter values to said set of interaction parameter values is determined based on a metric, which metric is defined by weighting the components, in particular by a weighting of the components that involves a user input.

When two parameter sets are compared with each other, wherein each set comprises several parameters (components), it may be that the different parameters (components) have a different significance for the desired surface properties (for example, the ability to repel water can be regarded as more important than the frictional resistance). By introducing a correspondingly adapted metric, control commands can be specifically provided that lead in particular to desired values for the interaction properties that are regarded as important, however have larger differences to from the intended values for parameters that are not so important. Such a course of action is particularly easy to manage for a user, if the weighting of the different interaction parameters is made by involving a user input. In this way the method is very flexible and can react to the specifications of the user.

Preferably, the components of the interaction parameter sets contain values for at least one of the following interaction parameters:
an interaction parameter that characterizes an interaction of the surface texture with a fluid flowing in contact with the same, in particular water, said interaction parameter preferably being the frictional resistance and/or the ability to repel water and/or noise, in particular for a given laminar and/or turbulent surrounding flow,
an interaction parameter that characterizes a haptics of the surface,
an interaction parameter that characterizes a reflection characteristics of the surface.

The ability to repel water or, more general, the wettability of the surface can be characterized by the spreading parameter.

According to the invention a preprocessor device, which is able to carry out a method of providing control commands for a layer-wise additive manufacturing device, comprises at least:
an allocation unit, which is constructed such that it allocates input data that represent at least a partial surface of the object to be manufactured, wherein the partial surface has an initial surface texture that is defined by a set of initial texture parameter values (201, 501, 601), which characterize the geometry of the initial surface texture,
a determination unit which when being in operation determines a set of target texture parameter values that differ from the set of initial texture parameter values,
a control command set generation unit, which when being in operation, generates control commands of a control command set, by which control commands said partial surface can be manufactured by means of the additive manufacturing device with a surface texture that is defined by the set of target texture parameter values.

After having provided control commands of a control command in accordance with the invention, by these control commands according to the invention a layer-wise additive manufacturing device can be controlled for manufacturing the object.

According to the invention a device for carrying out a layer-wise additive manufacturing method comprises a preprocessor device according to the invention and/or is connected to a preprocessor device according to the invention in terms of signalling.

A computer program according to the invention comprises a command sequence for carrying out a method according to the invention in a preprocessor device and/or a device for carrying out an additive manufacturing process.

Further developments of the invention are given in the dependent claims. Here, features from the dependent claims and from the following and the previous description that refer to a method according to the invention may also be used for developing further the device and preprocessor device, respectively, according to the invention or vice-versa, if this is not explicitly excluded.

DETAILED DESCRIPTION OF THE EMBODIMENTS

Figure 1:
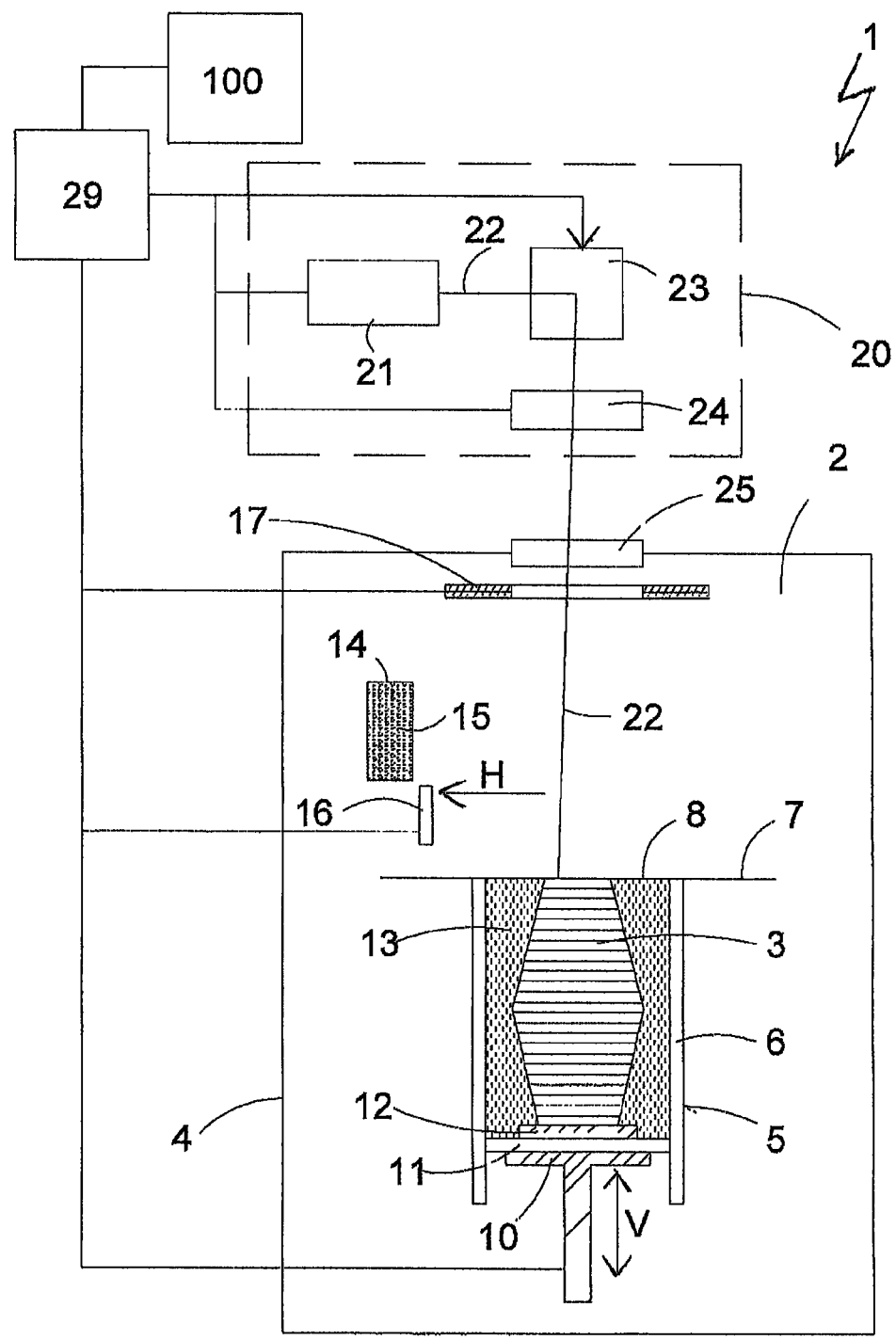
FIG. 1 shows a schematical representation of an additive manufacturing device using the example of a laser sintering device.

In the following, for a description of the method according to the invention at first a (layer-wise) additive manufacturing device shall be described using the example of a laser sintering or melting device by making reference to FIG. 1.

In order to build an object 3, the laser sintering or laser melting device 1 comprises a process chamber or build chamber 2 having a chamber wall 4.

A container 5, which is open to the top and has a container wall 6, is arranged in the process chamber 2. The top opening of the container 5 defines a working plane 7, wherein that region of the working plane 7 that lies inside of the opening and can be used for building the object 3 is designated as build area 8.

A support 10, which is movable in a vertical direction V is arranged in the container 5. A base plate 11 is attached to the support 10, which base plate 11 seals the container 5 at the bottom and thus forms the container bottom. The base plate 11 may be a plate formed separately from the support 10 and fixed to the support 10 or it can be formed integrally with the support 10. Depending on the powder that is used and on the process that is used, it is possible that further a building platform 12 is mounted on the base plate 11 as building support, on which the object 3 is built. However, the object 3 can also be built on the base plate 11 itself, which then serves as building support. In FIG. 1 the object 3 to be formed in the container on the building platform 12 is shown below the working plane 7 in an intermediary state with several solidified layers that are surrounded by building material 13 that remained unsolidified.

The laser sintering device 1 further contains a supply container 14 for a building material 15 in powder form that can be solidified by electromagnetic radiation and a recoater 16 for applying the building material 15 inside of the build area 8, which recoater 16 is movable in a horizontal direction H. Optionally, a radiant heating 17 is arranged in the process chamber 2, which radiant heating serves for heating the applied building material 15. For example, an infrared heater can be provided as a radiant heating 17.

The laser sintering device 1 further contains an irradiation device 20 having a laser 21 that generates a laser beam 22, which is deflected by a deflection device 23 and is focused onto the working plane 7 by a focusing device 24 via a coupling window 25 arranged at the top of the process chamber 2 in the chamber wall 4.

Furthermore, the laser sintering device 1 contains a control unit 29, by which the individual parts of the device 1 are controlled in a coordinated way for carrying out the building process. Alternatively, the control unit may also be arranged partially or completely outside of the device. The control unit may contain a CPU, the operation of which is controlled by computer program (software). The computer program can be stored separately from the device on a storage medium, from which storage medium it can be loaded into the device, in particular into the control unit.

The control unit 29 is controlled by means of a control command set, which a.o. contains data that include the structure of the number of objects to be manufactured, in particular a three-dimensional CAD layer model of the objects with information on the respective cross-section of an object in each layer of building material to be solidified, and data that determine the exact parameters for solidifying the building material. In particular, the data include an exact information on each layer that is to be solidified in the manufacturing of the number of objects. How a control command set looks like in detail is sufficiently described in the prior art and is not explained here further as this is not part of the present invention.

In operation, the control unit 29 lowers the support 10 layer by layer, the recoater is controlled for applying a new powder layer and the deflection device 23 and also the laser 21 and/or the focusing device 24, if necessary, are controlled for solidifying the respective layer at the positions corresponding to the respective object by means of the laser.

All powders and powder mixtures, respectively, that are suitable for the laser sintering or melting process, may be used as building material in powder form. Such powders include e.g. plastic powder such as polyamide or polystyrene, PAEK (polyaryletherketone), elastomers like PEBA (polyether block amide), plastic-coated sand, ceramic powder or metal powder as e.g. stainless steel powder or other metal powders adapted to the respective purpose, in particular alloys.

The layer-wise additive manufacturing device according to the invention further contains a preprocessor device 100, which is described further below. This preprocessor device 100 provides control commands for a control command set, which control command set is taken as a basis by the control unit 29 when carrying out the manufacturing process of an object.

Besides laser sintering also laser melting methods, masking methods, in which masks are used for a selective solidification of a material layer, 3D printing methods, stereolithography methods, etc. belong to layer-wise additive manufacturing methods covered by the invention. Of course, the additive manufacturing device described above as an example has a different setup, know from the prior art, in case the method is not a laser sintering or melting method. Also, an additive manufacturing device according to the invention for a laser sintering or melting method covers also device modifications with respect to the above-described example as far as a preprocessor device 100 described further below exists, which preprocessor device 100 may also be a component of the control unit 29.

In an additive manufacturing method, in which objects are manufactured layer-wise from a building material, at first there exists a computer-based model (CAD model) of the object to be manufactured. This CAD model also includes the geometrical data of the surface of the object to be manufactured and, if necessary, also geometrical information on possible grid structures inside of the object. A control command set for the control unit 29 provides the control unit 29 with specific information for each position in a layer to be selectively solidified on how the solidification shall be effected by making reference to a computer-based model (CAD model) of the object to be manufactured. For example, in the case of a laser sintering or melting method this includes information on the laser intensity, the laser beam diameter, the sequence, in which the individual positions of the layer are solidified, a possible offset of the laser beam at the contour of a region to be solidified of the layer (beam offset), etc.

The inventive idea in its most general form is that a given object, which is characterized by its shape and a surface texture, is not merely manufactured as precisely as possible. Rather, the surface texture is determined independently from the shape of the object. As was already mentioned in the beginning, the interaction properties of an object surface with its surrounding essentially depend on the texture (the surface structure) of the surface. According to the invention it is thus possible to provide an object with completely new properties, which were unknown up to now, by specifying a different surface texture.

First Embodiment

In the following, a first embodiment of the invention is described by referring to FIGS. 2 to 4. Here, FIG. 4 schematically shows a preprocessor device according to the invention for a layer-wise additive manufacturing device and FIG. 3 shows the process flow of a method according to the invention.

Figure 2:
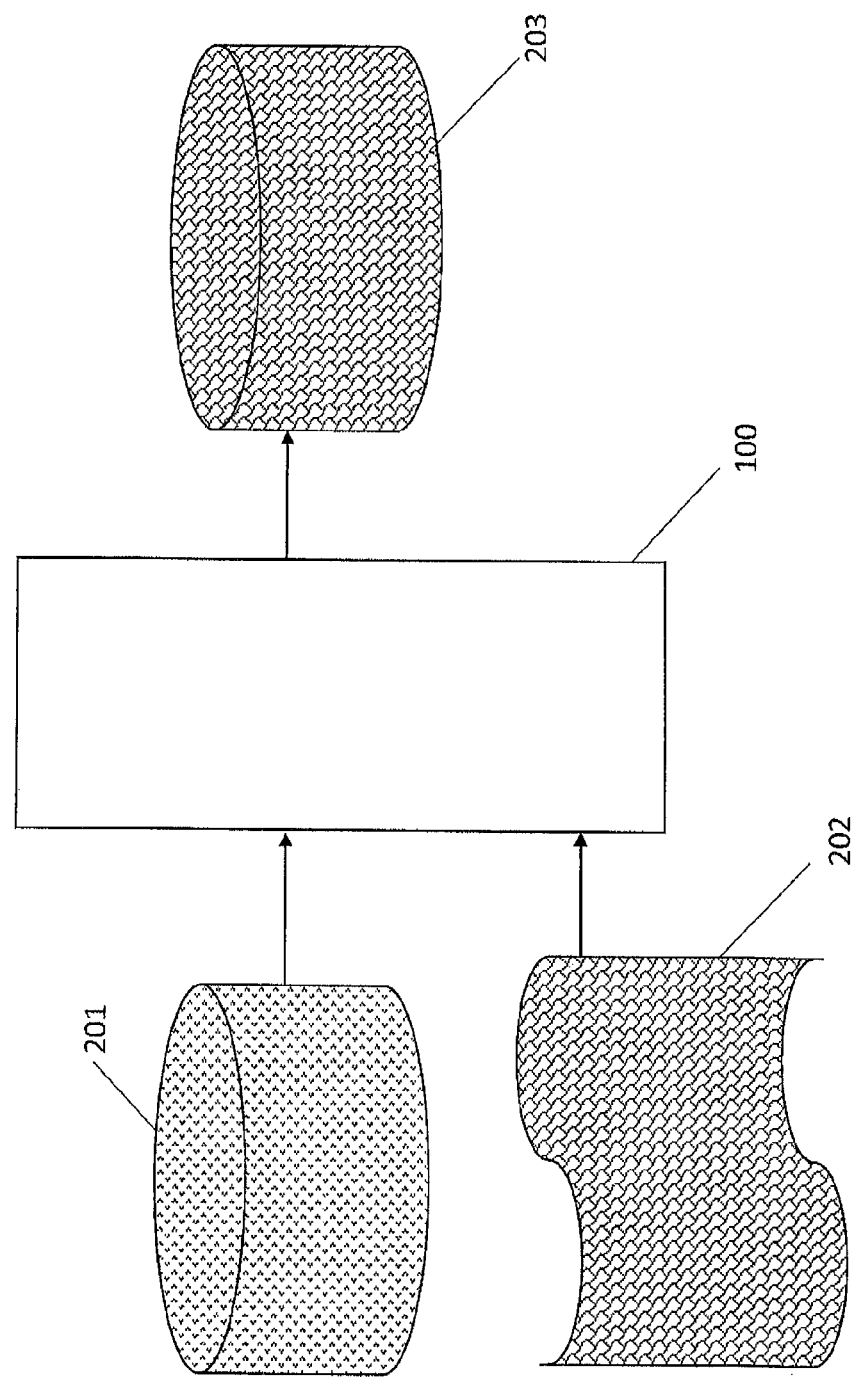
FIG. 2 shows a schematic representation of an approach when providing control commands of a control command set for an additive manufacturing device according to a first embodiment within the scope of the invention.
Figure 3:
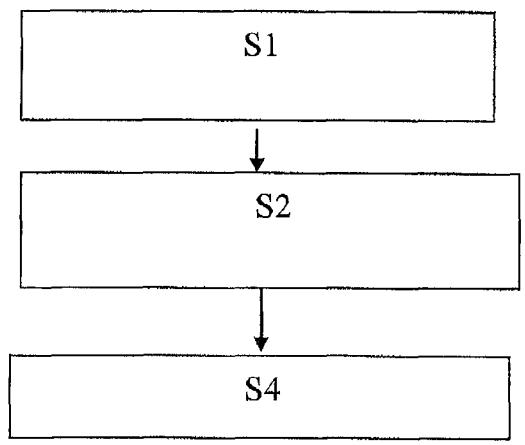
FIG. 3 shows a schematic representation of a method of providing control commands of a control command set for an additive manufacturing device according to a first embodiment of the invention.
Figure 4:
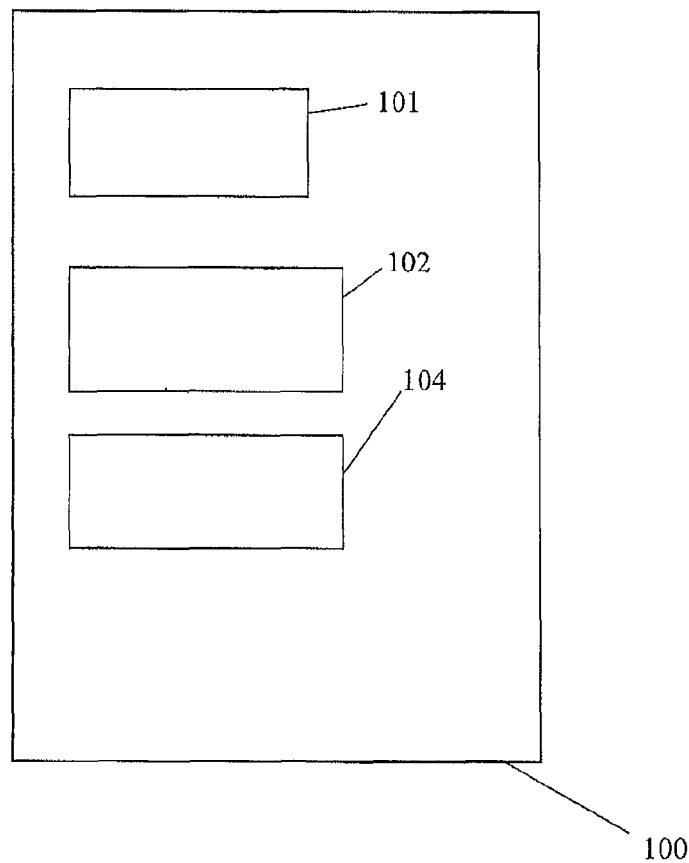
FIG. 4 shows schematically the setup of a preprocessor device according to the first embodiment of the invention.

As illustrated in FIG. 2, CAD data of the object to be manufactured (in the example cylindrically shaped) are transferred to a preprocessor device 100 that is designed for electronic data processing (step S1 in FIG. 3). As shown in FIG. 4, in the preprocessor device 100 the data are received by the allocation unit 101. As the case may be, the CAD data describing the surface or only a part of the surface may be sufficient.

The CAD data describing a (partial) surface of the object also include initial texture parameter values 201 for describing the initial surface texture of the (partial) surface of the object, meaning values for geometrical parameters, by which the texture of the (partial) surface is described. As shown in FIG. 2, a set of preferential texture parameter values 202 is additionally passed to the preprocessor device 100, which preferential texture parameter values are values of geometrical parameters, by which a desired texture of the (partial) surface of the object is described. This set of preferential texture parameter values can e.g. communicated to the preprocessor device 100 by a user via an input interface or else may have been already stored in a memory, preferably a database, from which the data are supplied to the preprocessor device 100.

According to the first embodiment, a determination unit 102 in the preprocessor device 100 assigns the set of preferential texture parameters values 202 to the (partial) surface of the object instead of the initial texture parameter values by correspondingly changing the CAD data of the object. Thereby, the preferential texture parameter values 202 are determined as target texture parameter values 203 for the surface texture of the (partial) surface of the object to be manufactured (step S2 in FIG. 3). Then a control command generation unit 104 generates control commands for a control command set, by which the (partial) surface of the object can be manufactured by means of the additive manufacturing device with the set of target texture parameter values 203 (step S4 in FIG. 3). In this respect a generation not only means a completely new creation of a complete control command set. Rather, this also refers to a change of an already existing control command set for manufacturing the object with the set of target texture parameter values 203 or to a procedure, in which only that information (control commands) is provided that is necessary for a geometrical description of the surface texture characterized by the set of target texture parameter values 203.

In practice, it would be conceivable for the first embodiment that a golf ball is realized with a specifically predetermined dirt-repellant surface or else a fin known from watersports is provided with a "golf ball texture" specified as desired texture, so that this fin can be used in an aircraft.

An approach according to the first embodiment makes it possible to manufacture an object with a desired surface texture specified by a set of preferential texture parameter values instead of an initial surface texture. Thereby, the desired interaction properties of an object with its surrounding can be set by specifying a desired surface texture independently from the shape and the material of the object.

Second Embodiment

Figure 7:
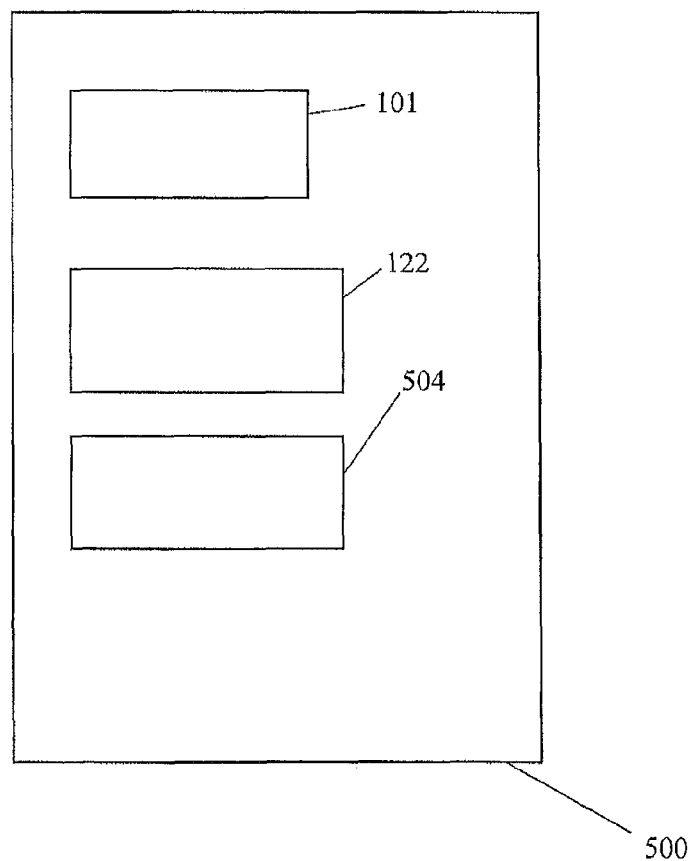
FIG. 7 shows schematically the setup of a preprocessor device according to the second embodiment of the invention.
Figure 8:
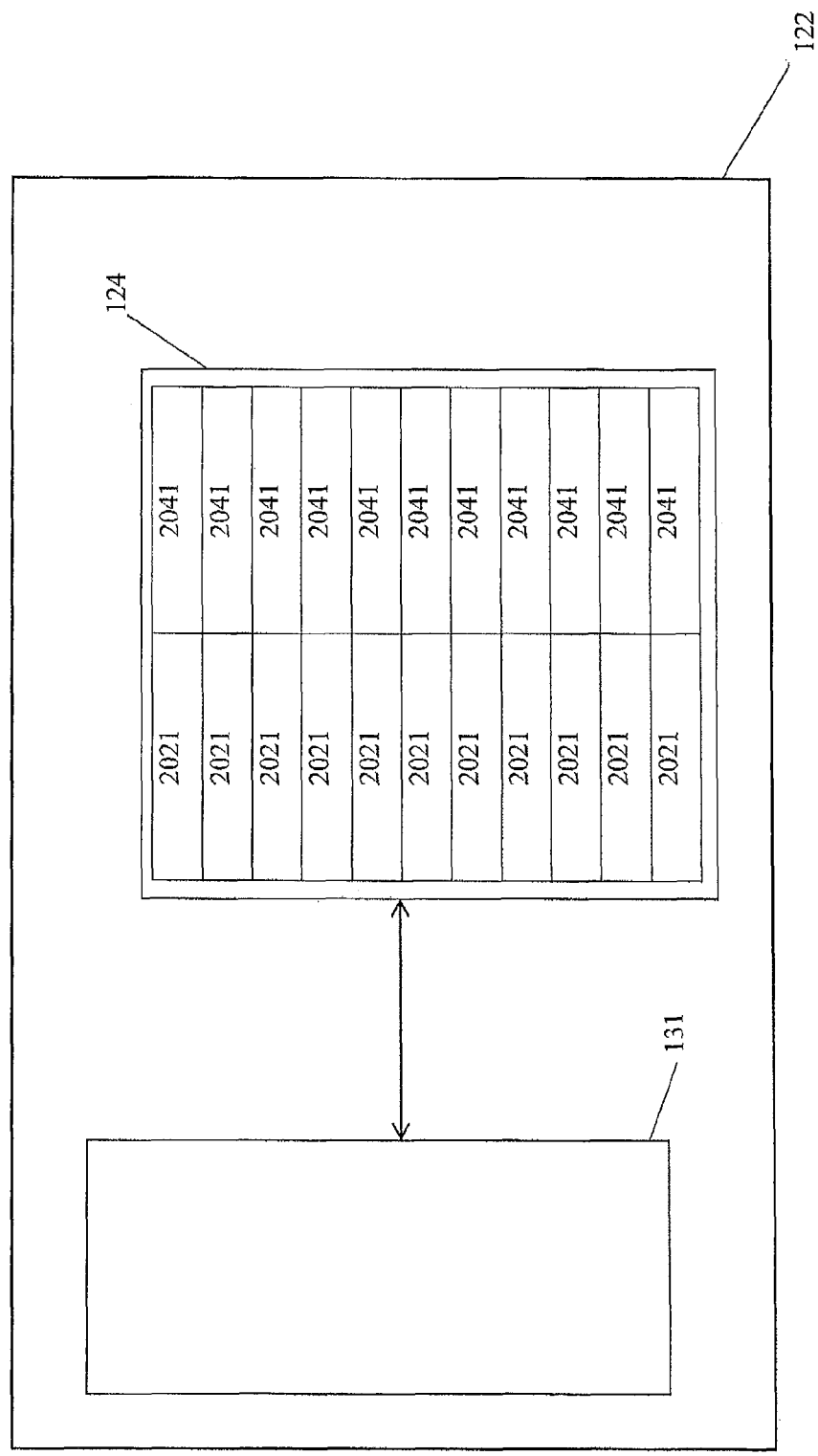
FIG. 8 shows schematically the setup of a determination unit according to the second embodiment of the invention.

In the following, a second embodiment of the invention will be described by making reference to FIGS. 5 to 8. Here, FIG. 7 and FIG. 8 schematically show a preprocessor device 500 and the setup of a determination unit 122 in the same according to the second embodiment. FIG. 6 shows the process flow of a method according to the second embodiment. In the following, only the differences with respect to the first embodiment will be described.

Figure 5:
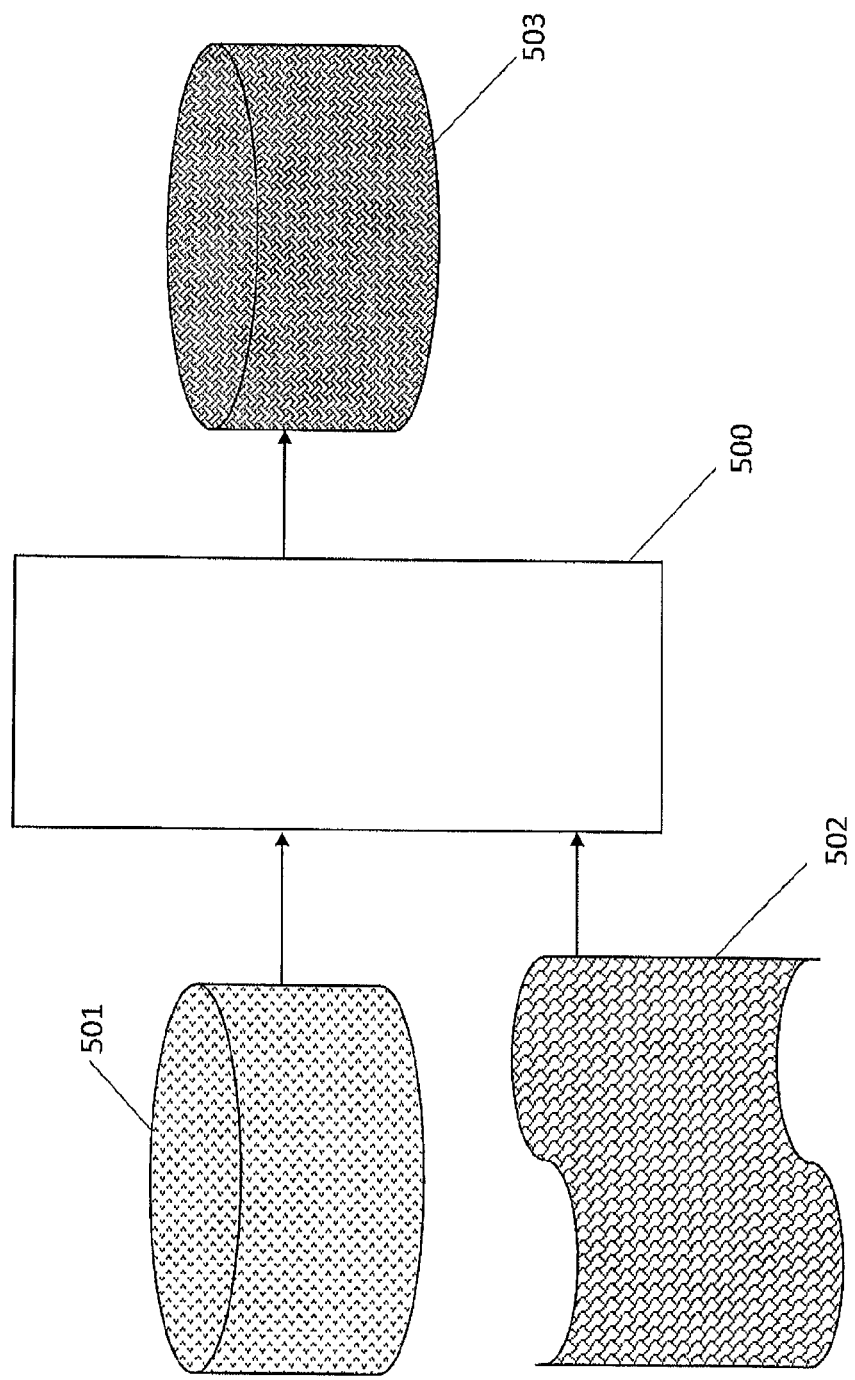
FIG. 5 shows a schematically representation of an approach when providing control commands of a control command set for an additive manufacturing device according to a second embodiment of the invention.
Figure 6:
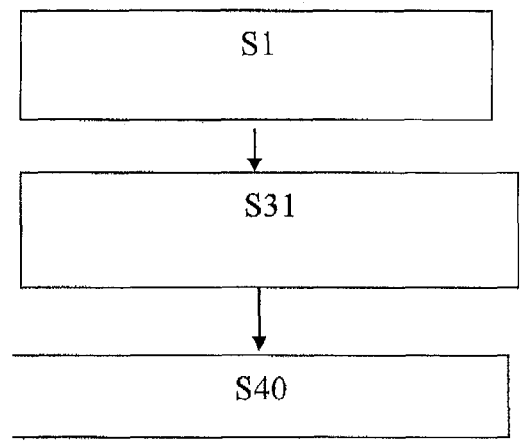
FIG. 6 shows a schematic representation of a method of providing control commands of a control command set for an additive manufacturing device according to a second embodiment of the invention.

As illustrated in FIG. 5, according to the second embodiment, CAD data of an object to be manufactured (in the example again cylindrically-shaped) are transferred to a preprocessor device 500 in the same way as in the first embodiment (step S1 in FIG. 6). In the preprocessor device 500 the data are received by an allocation unit 101 as it was the case in the first embodiment. As in the first embodiment, CAD data describing the surface or only a part of the surface may be sufficient, as the case may be.

The CAD data describing a (partial) surface of the object also include the initial texture parameter values 501 for describing the texture of the surface of the object, meaning values for geometrical parameters, by means of which the initial surface texture of the (partial) surface is described. As shown in FIG. 5, again a set of preferential texture parameter values 502 is additionally passed to the preprocessor device 500, which preferential texture parameter values 502 are values of geometrical parameters, by which a desired texture of the (partial) surface of the object is described. This set of preferential texture parameter values can be communicated to the preprocessor device 100, e.g. by a user via an input interface or else can already be stored in a memory, preferably a database, from where the data are supplied to the preprocessor device 500.

In contrast to the first embodiment, according to the second embodiment a determination unit 122 having a setup shown in FIG. 8 determines the target texture parameter values. Here, the determination unit comprises a database 124, in which to each one of different sets of existing texture parameter values 2021 an existing control command set 2041 is assigned, by which existing control command sets 2041 the respective set of existing texture parameter values 2021 can be generated.

Furthermore, the determination unit 122 comprises a comparison unit 131, which compares the set of preferential texture parameter values 502 with different sets of existing texture parameter values 2021 (step S31 in FIG. 6). Here, the number and type of preferential texture parameters preferably is the same as the number and type of existing texture parameters of a set of existing texture parameter values 2021. By the comparisons the determination unit 122 identifies that set of existing texture parameter values 2021 that has the smallest difference to the set of preferential texture parameter values 502 and determines this set of existing texture parameter values 2021 as set of target texture parameter values 503.

Finally, in step S40 in FIG. 6 control commands for a control command set are provided by a control command set generation unit 504 shown in FIG. 7 in that the existing control command set 2041 assigned to the set of target texture parameter values 503 in the database 124 (meaning the identified set of existing texture parameter values 2021) either is determined as control command set for manufacturing the object or, in case the existing control command set 2041 only includes those control commands that contain information for a geometrical description of the surface texture characterized by the set of target texture parameter values 503, the latter control commands are provided for an integration into a complete control command set.

The contents of the database is the result of previous test series, in which by a number of tests a correlation was found for different combinations of texture parameter sets and control command sets. Here, these control command sets are assigned to a very specific type of additive manufacturing device, possibly only to a specific model. In special cases the database may contain control command sets for a very specific individual additive manufacturing device.

An approach according to the second embodiment makes it possible to automatically replace a desired texture for an object defined by a set of preferential texture parameter values, which desired texture possibly can be realized by means of an additive manufacturing device only with reduced quality, by a texture that comes as close as possible to the desired texture, however can be realized with high quality.

Modification of the Second Embodiment

A modification of the second embodiment will be described in the following using the example of a fin for a watercraft (e.g. a surfboard), which fin is to be manufactured. Here, FIG. 10 and FIG. 11 schematically show a preprocessor device 500a and the setup of a determination unit 122a according to the modification of the second embodiment and FIG. 9 shows the process flow of a method according to the modification of the second embodiment.

In the modification of the second embodiment the control commands for the control command set for the manufacturing of an object, here the fin, by means of an additive manufacturing device are identified based on the interaction properties of the object surface with its surrounding, here the interaction of the fin with the water when it is used in the water, wherein a desired texture is specified for at least a part of the surface of the object, here the fin, by a set of preferential texture parameter values 502. For simplicity reasons it is dealt here only with the frictional resistance (skin friction drag) and the ability to repel water as interaction parameters. With respect to the frictional resistance it has to be added here that for the purpose of comparison it has to be precisely defined which type of flow (laminar and/or turbulent) strikes the surface. However, as such kind of definition is of no relevance for the present invention, this is not treated here in detail.

Figure 9:
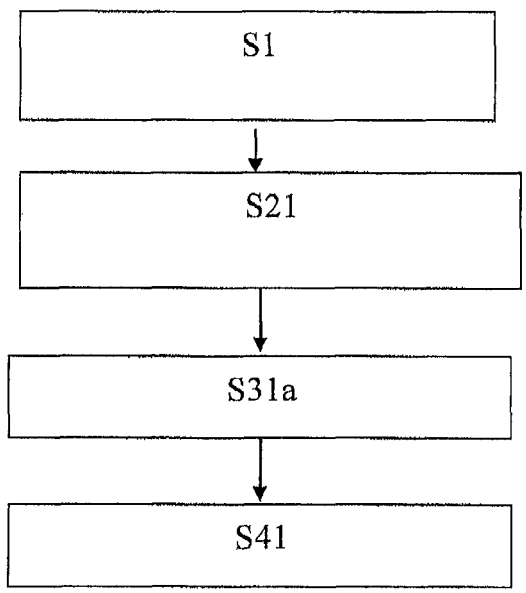
FIG. 9 shows a schematic representation of a method of providing control commands of a control command set for an additive manufacturing device according to a modification of the second embodiment of the invention.
Figure 10:
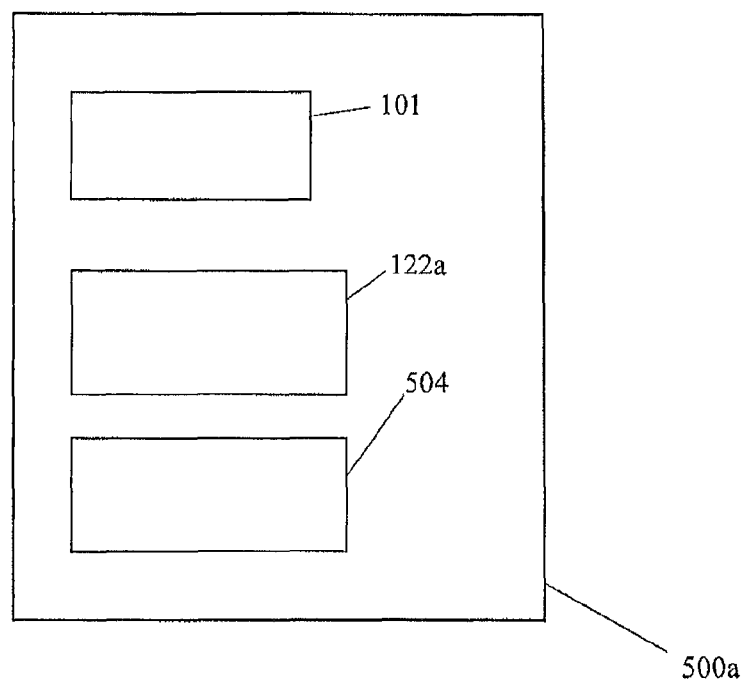
FIG. 10 shows the setup of a preprocessor device according to a modification of the second embodiment of the invention.

At first, the allocation unit 101 in the preprocessor device 500a receives CAD data of the fin to be manufactured (step S1 in FIG. 9). As the case may be, the CAD data describing the surface will be sufficient.

Figure 11:
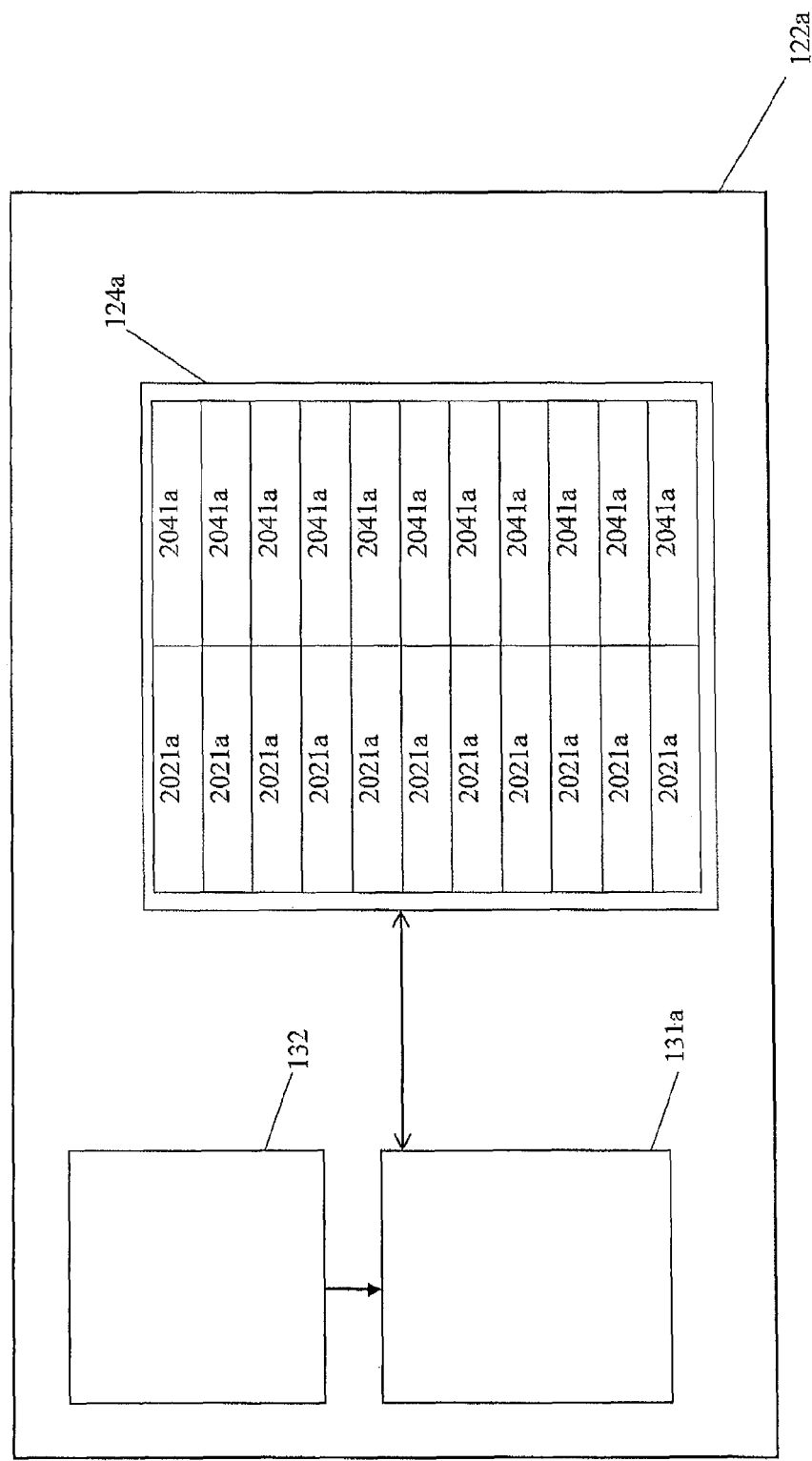
FIG. 11 shows schematically the setup of a determination unit according to a modification of the second embodiment of the invention.

In the modification of the second embodiment the preprocessor device 500a comprises a determination unit 122a, the setup of which is shown in FIG. 11, instead of the determination unit 122. The determination unit 122a contains an interaction parameter determination unit 132, which is constructed such that it identifies for a desired texture specified by the set of preferential texture parameter values 502 a set of interaction parameter values, which characterize the interaction of the desired texture with the surrounding, here the interaction of the fin with the water (step S21 in FIG. 9). In the present example the set of interaction parameters includes the frictional resistance and the ability to repel water.

Furthermore, a database 124a exists in the determination unit 122a, in which database to each one of different sets of existing interaction parameter values 2021a is assigned an existing control command set 2041a for generating a surface texture that characterizes the respective set of existing interaction parameter values 2021a.

Furthermore, the determination unit 122a includes a comparison unit 131a that compares the set of interaction parameter values identified by the interaction parameter determination unit 132 with different sets of existing interaction parameter values 2021a (step S31a in FIG. 9). Preferably, the number and type of interaction parameters of the set of interaction parameter values identified by the interaction parameter determination unit 132 should be the same as the number and type of existing interaction parameters of a set of existing interaction parameter values 2021a, so that such a comparison is possible in a simple way. By the comparisons the determination unit 122a determines that set of existing interaction parameter values 2021a that has the smallest difference to the set of interaction parameter values determined by the interaction parameter determination unit 132. The (partial) surface that can be manufactured by the assigned existing control command set 2041a then automatically has a surface texture, which in analogy to the second embodiment is implicitly characterized by a set of target texture parameter values, which set of target texture parameter values has been implicitly determined by identifying that set of existing interaction parameter values 2021a that has the smallest difference to the set of interaction parameter values identified by the interaction parameter determination unit 132.

Finally, in step S41 in FIG. 9 control commands for a control command set are generated by a control command set generation unit 504 shown in FIG. 10, in that the existing control command set 2041a, which is assigned to the set of existing interaction parameter values 2021a in the database 124a that has the smallest difference, either is determined as control command set for manufacturing the object or, in case this existing control command set 2041a only includes those control commands that contain the information for a geometrical description of the surface texture characterized by the set of target texture parameter values, the latter control commands are provided for an integration into a complete control command set.

As just mentioned, the existing control command sets 2041a stored in the database may be complete control command sets for manufacturing the object or else may be only parts of a corresponding control command set.

The contents of the database 124a is the result of previous test series, in which by a number of tests a correlation was established between different combinations of interaction parameter sets and control command sets. Here, these control command sets are assigned to a very specific type of additive manufacturing device, possibly only to a specific model. In special cases, the database may contain control command sets for a very specific individual additive manufacturing device.

An approach according to the modification of the second embodiment makes it possible to automatically replace a desired texture specified for an object by a set of preferential texture parameter values, which desired texture possibly can be realized by means of an additive manufacturing device only with reduced quality, by a texture, which with its interaction properties comes as close as possible to the desired texture, but can be realized with high quality.

In order to determine a set of interaction parameter values for the desired texture specified by the set of preferential texture parameter values 502, the interaction parameter determination unit 132 may carry out calculations, in particular simulations, based on basic fluid dynamics, wherein a specific flow characteristic of the water is assumed. However, it is also possible that a set of interaction parameter values assigned to a set of preferential texture parameter values 502 is transferred to the preprocessor device 500a together with the set of preferential texture parameter values 502. In particular, the set of interaction parameter values can also be provided by a user input.

Third Embodiment

The third embodiment is similar to the second embodiment, however differs from the same in that the preprocessor device is only provided with the CAD data describing the (partial) surface of the object and not with a set of preferential texture parameter values, by which a desired texture of the (partial) surface of the object is described. Here, the process flow of the method according to the third embodiment differs from the one shown in FIG. 6 in that in step S31 no comparison of a set of preferential texture parameter values 502 with different sets of existing texture parameter values 2021 is made, but a comparison of the set of initial texture parameter values 501 included in the CAD data describing a (partial) surface of the object with different sets of existing texture parameter values 2021 is made.

Then, by the comparisons the determination unit 122 determines that set of existing texture parameter values 2021 having the smallest difference to the set of initial texture parameter values 501 and determines this set of existing texture parameter values 2021 as set of target texture parameter values 503.

An approach according to the third embodiment makes it possible to automatically replace an initial texture originally specified by a set of initial texture parameter values for an object, which initial texture possibly can be realized by means of an additive manufacturing device only with reduced quality, by a texture that comes as close as possible to the initial texture, however is realizable with high quality.

Modification of the Third Embodiment

The modification of the third embodiment is similar to the modification of the second embodiment, however differs from the same in that the preprocessor device is provided only with the CAD data describing a (partial) surface of the object and is not provided with a set of preferential texture parameter values, by which a desired texture of the (partial) surface of the object is described.

In the modification of the third embodiment an interaction parameter determination unit 132 is constructed such that it determines for the initial texture specified by the set of initial texture parameter values 501 a set of interaction parameter values that characterizes the interaction of the initial texture with the surrounding. Otherwise, the approach and the used devices are identical to the modification of the second embodiment.

An approach according to the modification of the third embodiment makes it possible to automatically replace an initial texture specified by a set of initial texture parameter values for an object, which initial texture possibly can only be realized by an additive manufacturing device with reduced quality, by a texture, which with its interaction properties comes as close as possible to the initial texture, however can be realized with high quality.

Fourth Embodiment

Figure 13:
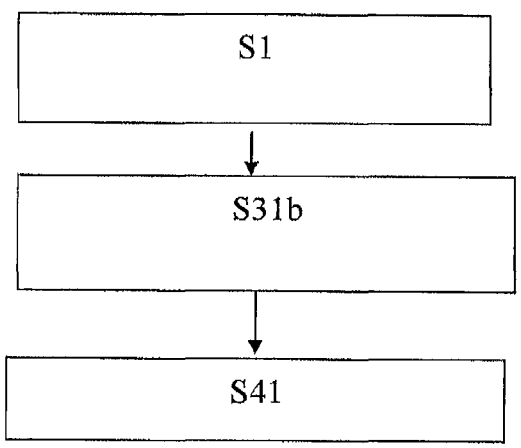
FIG. 13 shows a schematic representation of a method of providing control commands of a control command set for an additive manufacturing device according to a fourth embodiment of the invention.
Figure 14:
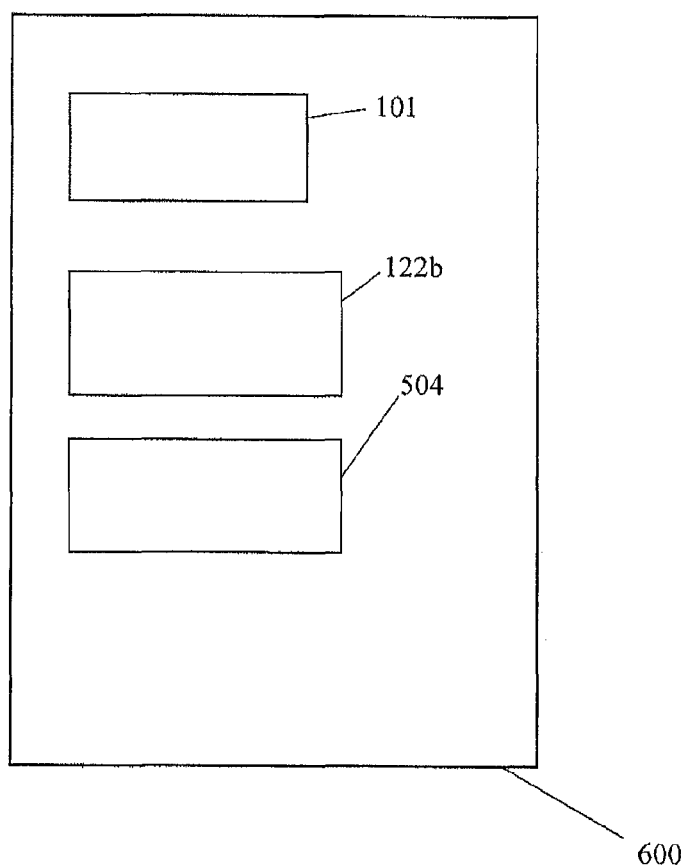
FIG. 14 shows schematically the setup of a preprocessor device according to the fourth embodiment of the invention.
Figure 15:
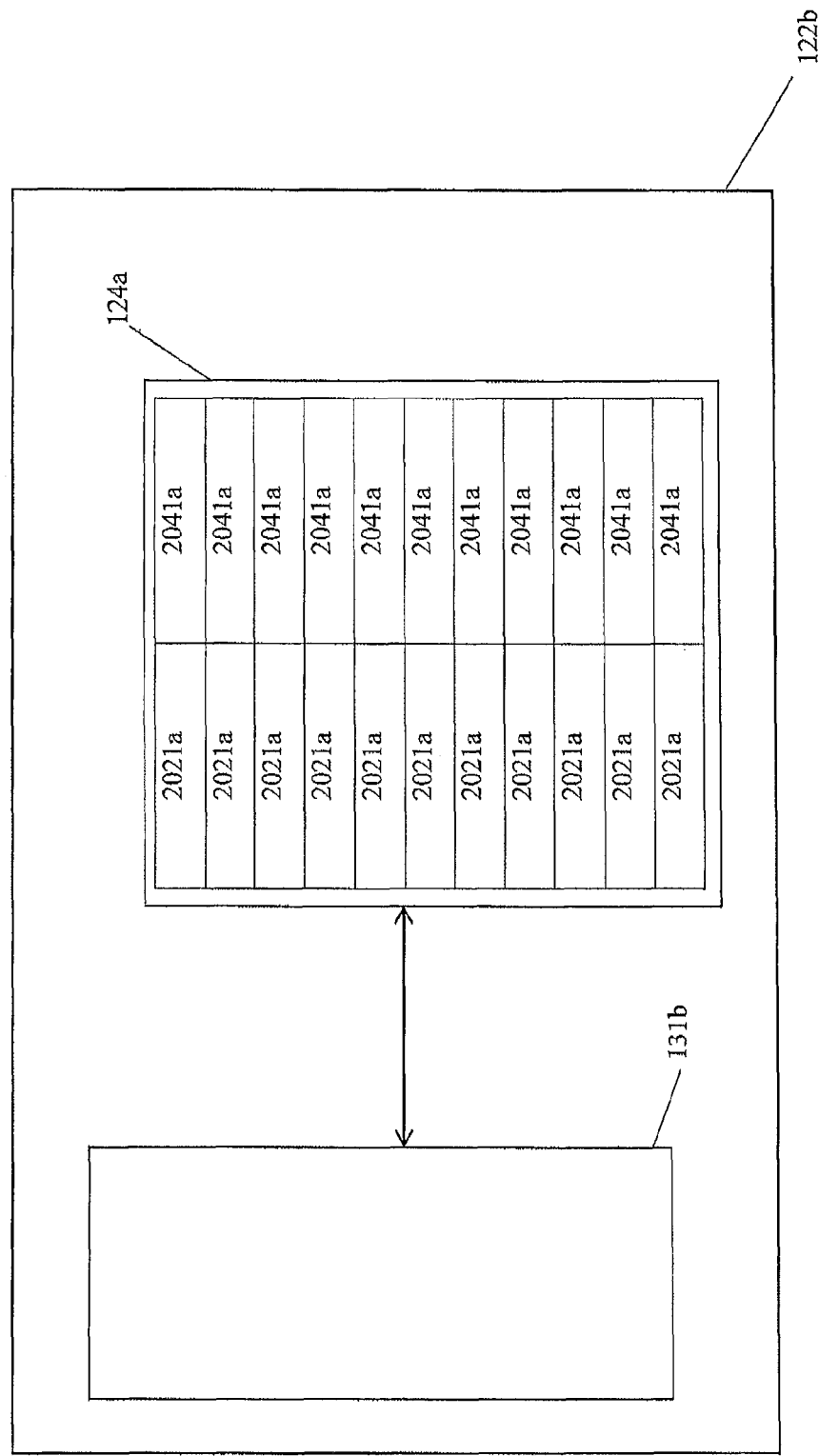
FIG. 15 shows schematically the setup of a determination unit according to the fourth embodiment of the invention.

A fourth embodiment of the invention is described in the following by making reference to FIGS. 12 to 15. Here, FIG. 14 and FIG. 15 schematically show a preprocessor device 600 and the setup of a determination unit 122b according to the fourth embodiment. FIG. 13 shows the process flow of a method according to the fourth embodiment. In the following only the differences with respect to the modification of the second embodiment are described.

Figure 12:
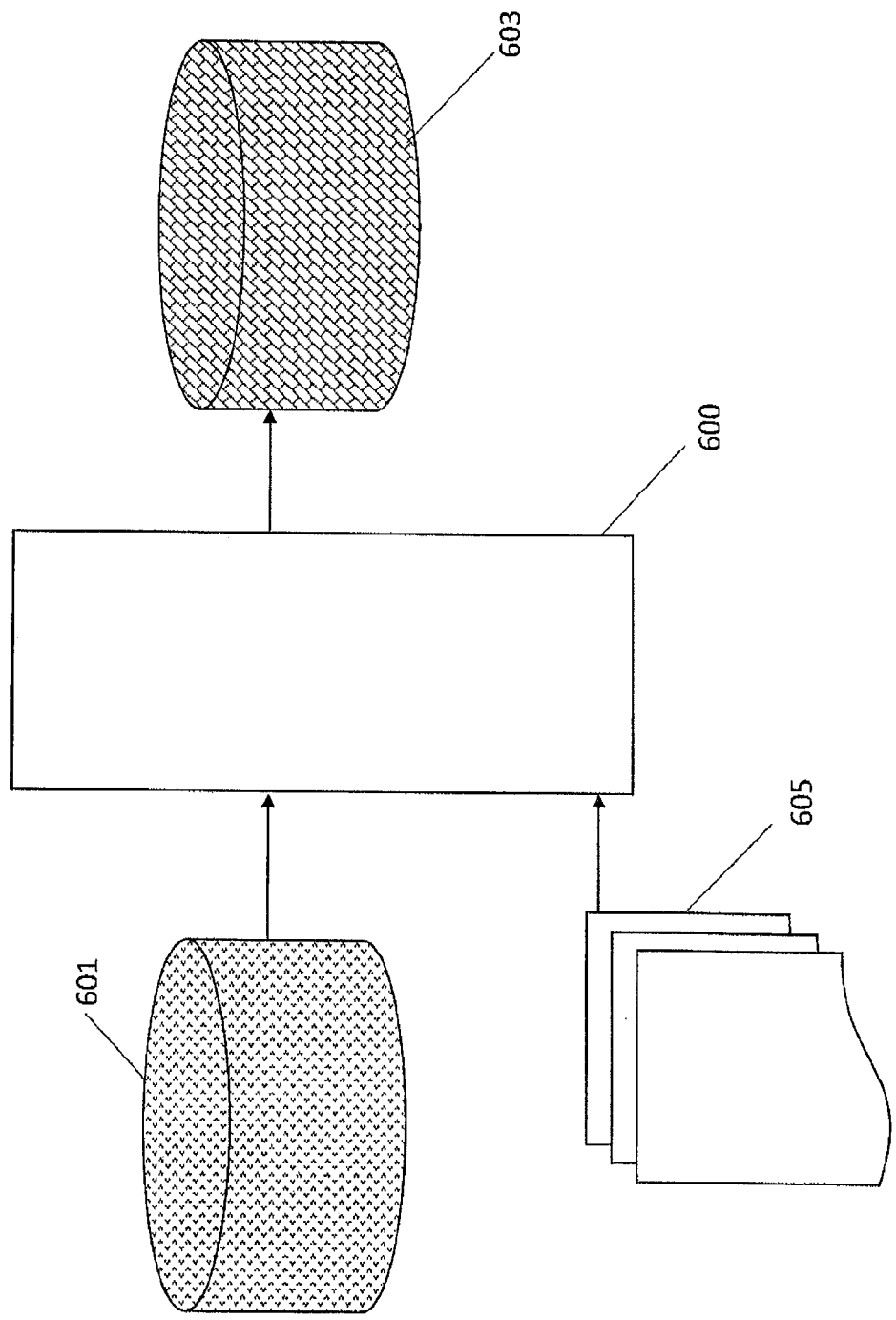
FIG. 12 shows a schematic representation of an approach for providing control commands of a control command set for an additive manufacturing device according to a fourth embodiment of the invention.

As illustrated in FIG. 12, according to the fourth embodiment CAD data of a (in the example again cylindrically shaped) object that is to be manufactured are passed to a preprocessor device 600 (step S1 in FIG. 13) like in the modification of the second embodiment. The CAD data also include a set of texture parameter values 601 that describe an initial surface texture. As it was the case for the modification of the second embodiment, an allocation unit 101 in the preprocessor device 600 receives the data. As the case may be, CAD data describing the surface and only a part of the surface, respectively, may be sufficient like in the modification of the second embodiment.

In contrast to the modification of the second embodiment, in the fourth embodiment, a set of preferential texture parameter values 502, which are values of geometrical parameters, by which a desired texture of the (partial) surface of the object is described, is not passed to the preprocessor device. Instead, a set of preferential interaction parameter values 605 characterizing a desired interaction of the (partial) surface of the object with the surrounding, which (partial) surface is described by the CAD data, is passed to the preprocessor device. This set of preferential interaction parameter values 605 can e.g. be communicated to the preprocessor device 600 by a user via an input interface or else can already have been stored in a memory, preferably a database, from where the data are supplied to the preprocessor device 600.

In the fourth embodiment the preprocessor device 600 comprises a determination unit 122b, the setup of which is shown in FIG. 15, instead of the determination unit 122a. The determination unit 122b does not comprise an interaction parameter determination unit 132. The determination unit 122b comprises instead of the comparison unit 131a a comparison unit 131b that compares the set of preferential interaction parameter values 605 with different sets of existing interaction parameter values 2021a (step S31b in FIG. 13) which sets of existing interaction parameter values 2021 are stored in the database 124a, which otherwise has the same setup as the one in the modification of the second embodiment. By the comparisons the determination unit 122b identifies that set of existing interaction parameters values 2021a that has the smallest difference to the set of preferential interaction parameter values 605. The (partial) surface, which can be manufactured by the assigned existing control command set 2041a, then has automatically the target texture parameter values 603 for which the interaction properties of the (partial) surface with the surrounding come as close as possible to the interaction properties specified by the set of preferential interaction parameter values 605.

Finally, in step S41 in FIG. 13 a control command set generation unit 504 shown in FIG. 14 generates control commands for a control command set, in that the existing control command set 2041a assigned to the set of existing interaction parameter values 2021a having the smallest difference either is determined as control command set for manufacturing the object or, in case this existing control command set 2041a includes only those control commands that contain the information for a geometrical description of the surface texture characterized by the set of target texture parameter values, provides those control commands for an integration into a complete control command set.

Thus, the existing control command sets 2041a stored in the database can again be complete control command sets for manufacturing the object or else be only parts of a corresponding control command set.

An approach according to the fourth embodiment makes it possible to specify interaction properties of an object with its surrounding and to realize the object such that it has these interaction properties.

Modification of the Fourth Embodiment

Figure 16:
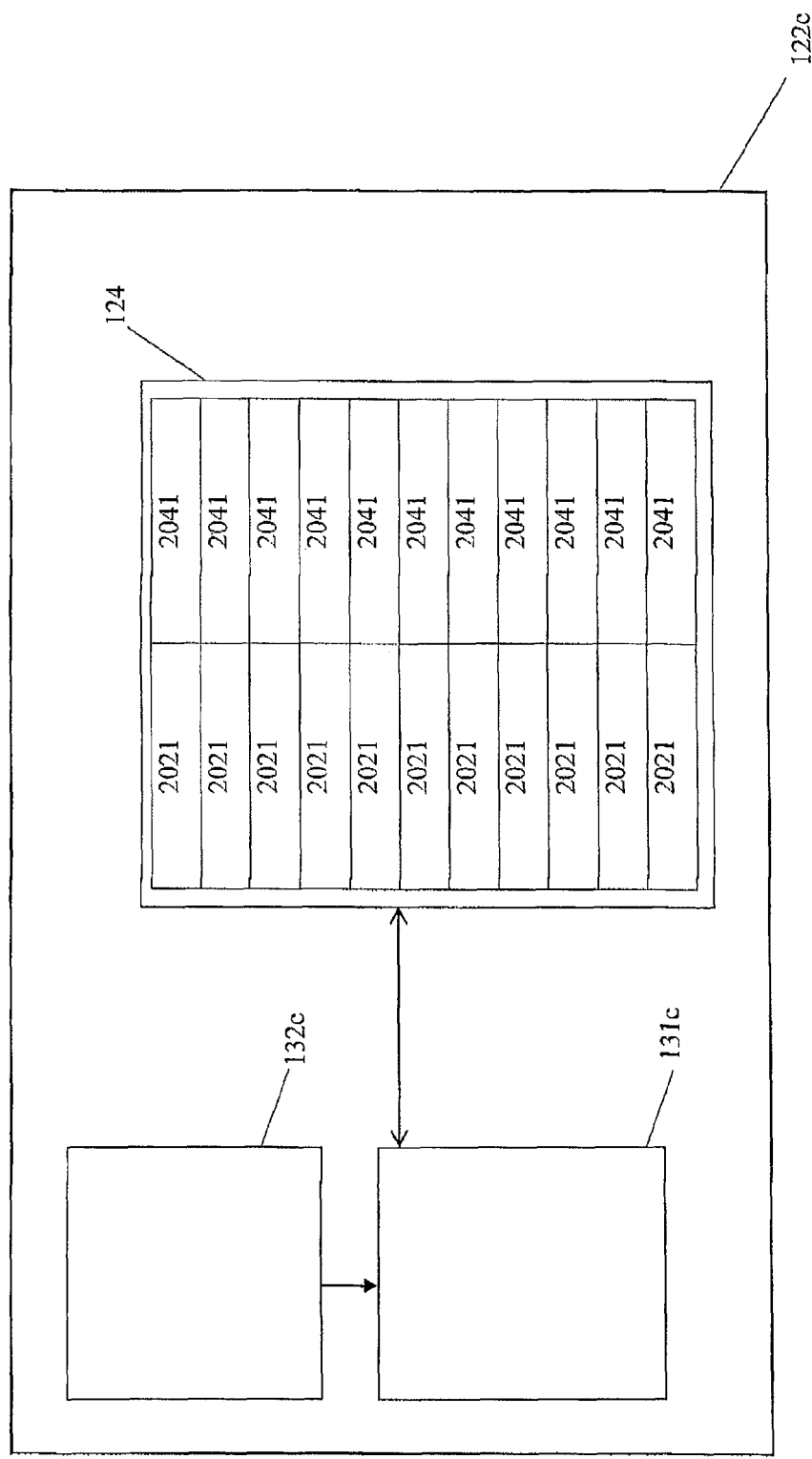
FIG. 16 shows schematically the setup of a determination unit according to a modification of the fourth embodiment of the invention.

In a modification of the fourth embodiment a determination unit 122c has a setup shown in FIG. 16. The determination unit 122c comprises a texture parameter determination unit 132c that determines for the set of preferential interaction parameter values 605 a set of texture parameter values that has a surface having interaction properties specified by the set of preferential interaction parameter values 605. Here, the determination unit comprises a database 124, in which to each one of the different sets of existing texture parameter values 2021 an existing control command set 2041 for generating the respective set of existing texture parameter values 2021 is assigned.

Furthermore, the determination unit 122c comprises a comparison unit 131c that compares the set of texture parameter values identified by the texture parameter determination unit 132c with different sets of existing texture parameter values 2021. Here, the number and type of existing texture parameters preferably is the same as the number and type of texture parameters identified by the texture parameter determination unit 132c. By the comparisons the determination unit 122c identifies that set of existing texture parameter values 2021 that has the smallest difference to the set of texture parameter values identified by the texture parameter determination unit 132c and determines this set of existing texture parameter values 2021 as set of target texture parameter values.

Besides the frictional resistance (skin friction drag) and the ability to repel water, which were already mentioned in the above embodiments and modifications, other interaction parameters are possible that characterize an interaction of the surface texture with a fluid flowing around the same such as the noise occurring for specified flow conditions around the object. Moreover, the interaction parameters may also refer to other types of interaction with the surrounding:

Different surface textures lead to different haptic perceptions, when the corresponding surfaces are touched. Therefore, haptic interaction parameters may be introduced that could correspondingly have values for properties like "soft", "rough", "grooved", etc., in that numerical scales for the distinctiveness of the individual parameters (softness, roughness etc.) are introduced, by which a comparison becomes possible. A further example would be the optical characteristics of different surface texture, in particular the way in which light is reflected. Also here, one could define respective values for interaction parameters.

It shall also be mentioned that the present invention assumes that every object surface has some type of texture. In case a surface is not described by explicitly specifying a set of texture parameter values, a set of texture parameter values may also be implicitly included in the CAD data describing the surface of the object.

In all presented embodiments and modifications the control commands provided by the preprocessor device for a control command set (this may also be a modification of an existing control command set) are provided for being used when carrying out an additive manufacturing process with an additive manufacturing device. In case the preprocessor device does not provide a complete control command set, but only parts thereof, the generation of a control command set based on these parts is obvious for the skilled person and is therefore not explained further.

Furthermore, in all embodiments and modifications thereof data that describe a (partial) surface of an object and originate e.g. from a CAD design system either may be transferred to the preprocessor device via a network or may be read from a mobile data medium into the preprocessor device. In particular, the preprocessor device may also be part of a CAD design system. In the latter case the preprocessor device can simply access the storage location of the data inside of the design system.

Each one of the databases 124 and 124a mentioned in the above embodiments and modifications thereof may be a memory device and/or a memory access system that manages the database entries, which exist on one or more memory devices that may also be physically separated from the respective determination unit (for example be only connected to the respective determination unit in terms of signalling, in particular via a network).

In the presented embodiments and modifications thereof parameter sets are compared to each other in order to determine a difference U between two parameter sets. When two parameter sets are compared to each other, each of which has more than one component K, there are basically different approaches possible for defining the degree of similarity of two parameter sets. One possibility would be to define the difference U between two parameter sets via the equation $$U=\sqrt{(\Delta K1^2+\ldots+\Delta Kj^2+\ldots+\Delta Kn^2)} \quad (1),$$

where ΔK1, ΔKj and ΔKn specify the difference between the first, jth and the nth, respectively, component of the first and second parameter sets (wherein it is assumed that each one of the parameter sets comprises n components (meaning interaction parameters)). Thus, in the above sum j assumes values between 2 and n−1.

Thus, in the example with two interaction parameters this would result in $U=\sqrt{(\Delta K1^2+\Delta K2^2)}$.

However, likewise one could define the difference between two parameter sets simply via the sum over the absolute values of the differences of the individual components in the sense of:

$$U=|\Delta K1|+\ldots+|\Delta Kj|+\ldots+|\Delta Kn| \quad (2)$$

What kind of distance definition between parameter sets is chosen in detail has no relevance for the inventive idea.

The way in which a comparison between two parameter sets is made can in general be defined by using vector spaces. Assuming each one of a first parameter set P1 and a second parameter set P2i to be parameter vectors in a vector space, wherein the dimension of the vector space corresponds to the number of components of the parameter vectors, the difference of a first parameter set P1 from a second parameter set P2i corresponds to the distance between the two parameter vectors P1 and P2i in the vector space. The way in which the distance between two parameter vectors or parameter sets is defined depends on the respective underlying metric, by which distances in the vector space and differences are defined. Here, there are multiple possibilities of determining the metric, wherein equations (1) and (2) only describe special cases.

The above vector space concept in its generality may be implemented by software very well. It allows to change the way of determining the difference between two parameter sets in a simple way, in that simply a desired vector space metric is applied.

When determining differences between parameter sets and parameter vectors, respectively, it may occur that a match as good as possible for some components is more important than for other components. In order to make a comparison possible nevertheless, weighting factors Wj may be defined for the individual components. The above equations (1) and (2) would then result in the equations:

$$U=\sqrt{((W1\cdot\Delta K1)^2+\ldots+(Wj\cdot\Delta Kj)^2+\ldots+(Wn\cdot\Delta Kn)^2)} \quad (1')$$

and $$U=W1\cdot|\Delta K1|+\ldots+Wj\cdot|\Delta Kj|+\ldots+Wn\cdot|\Delta Kn| \quad (2'),$$

respectively. For example, if in the case of the equation (1') with n being equal to 2 the second component K2 (for example the ability to repel water) was rather unimportant, one would for example choose a weighting factor W1 that is remarkably larger (for example 0.9) and a weighting factor W2 that is remarkably smaller than the weighting factor W1 (e.g. 0.1). In the vector space model the weighting factors would be incorporated into the definition of the underlying metric. The weighting factors for the individual interaction parameters may either be stored in the preprocessor device or else be directly specified by a user at an input terminal.

In a particular embodiment of the above modifications of the second and third embodiments the determination unit makes an optimization of at least one of the interaction parameters (meaning components) of the set of interaction parameters identified by the interaction parameter determination unit before the comparison to the existing interaction parameter values. In the process, individual interaction parameters or all interaction parameters are changed to more desired values. For these changes the determination unit may resort to user inputs, by which explicit values for at least one of the interaction parameters are specified. Alternatively, the determination unit may change the identified interaction parameters based on an automatic optimization algorithm.

For an automatic optimization operation it is at first necessary to define in which way an optimization shall be effected. For example, it can be specified that individual interaction parameters are preferred to be larger or smaller (e.g. larger frictional resistance and smaller ability to repel water). However, for an automatic optimization the following approach is suitable:

The identified set of interaction parameters is treated as parameter vector in a vector space, the dimension of which is the same as the number of components of the set of interaction parameters. In this vector space a preferential norm is defined, which determines the length of the parameter vectors. Then the length corresponds to the preferential factor. The optimization algorithm now can vary the components of the determined set of interaction parameters such that higher preferential factors result.

A differing importance of different interaction parameters can be taken into consideration by weighting factors that are considered when defining the preferential norm. These weighting factors, by which for example the individual components of the parameter vector have to be multiplied, may be determined by a user input or alternatively the user can even enter, which (if necessary pre-defined) preferential norm shall be the basis for the optimization algorithm.

The mentioned approach describes in a mathematically general way, how a set of interaction parameters can be automatically optimized. The described approach using parameter vectors in a vector space is not limited to an explicit definition of parameter vectors and vector spaces. Also an approach in which merely the individual interaction parameters are maximized or minimized in the end is nothing else than implicitly determining a norm in a vector space. For example, in case the skin frictional drag shall be minimized and the ability to repel water shall be maximized, the corresponding norm would specify that only the size of the value of the ability to repel water determines the preferential factor and thus the length of a parameter vector in the vector space.

An optimization of interaction parameters may be made not only before, but in addition or alternatively also after the identification of a control command set. In case the interaction parameters that can be actually realized with the selected control command set differ from the desired interaction parameters, the preprocessor device can e.g. check, whether parameter values of the components (one, several or all components) of a set of interaction parameters assigned to a selected control command set lie within an acceptance range or not. In case they don't lie within an acceptance range, an optimization process may be carried out, by which optimization process the parameter values are changed again a little and are again subjected to the comparison and determination step as components of the set of interaction parameters.

Alternatively and/or in addition the components (parameter values) of the set of interaction parameters assigned to the control command set selected at first are presented to the user on a display device, whereupon the user may decide, whether the parameter values are acceptable or whether an optimization as just described shall be carried out.

The weighting factors that were mentioned sometimes before may basically also assume the value zero in order to express, which interaction parameters are of no relevance.

Though above often the manufacturing of an object was mentioned, all statements apply in the same way also to the manufacturing of several objects in an additive manufacturing device in parallel. In particular, the mentioned (partial) surface may include (partial) surfaces of several objects.

Finally, it shall be mentioned that the individual components 101 to 104 of a preprocessor device may be implemented by means of hardware or as mere software modules or as mixtures from hardware and software. Moreover, the individual components of the preprocessor device may also be separated in space as far as a data exchange between these components is possible. In particular, interfaces need not necessarily be implemented as hardware components, but can also be implemented as software modules, for example when the data supplied to them or output by them are taken from another component implemented in the same device or are transferred to another component only by means of software. Also, the interfaces may consist of hardware and software components, e.g. a standard hardware interface configured by means of software for the specific purpose in a specific way. Also, several interfaces may be combined in a common interface such as an input output interface.

The invention claimed is:

1. A computer-based method of providing control commands of a control command set for manufacturing a three-dimensional object by an additive manufacturing device, the method comprising at least the following steps:

allocating input data representing at least a partial surface of an entire surface of the three-dimensional object to be manufactured, wherein the partial surface has an initial surface texture defined by a set of initial texture parameter values that characterize a geometry of the initial surface texture, wherein the input data includes a set of preferential texture parameter values that characterize a preferential surface texture of the partial surface;

comparing the set of preferential texture parameter values with different sets of existing texture parameter values and determining a set of existing texture parameter values by the step of comparing the set of preferential texture parameter values with the different sets of existing texture parameter values which is a set of target texture parameter values having values that are the least different to the set of preferential texture parameter values;

assigning an existing control command set of an additive manufacturing device to each of the sets of existing texture parameter values to manufacture the partial surface by the additive manufacturing device with a surface texture that is defined by the corresponding set of existing texture parameter values; and generating control commands of a control command set to manufacture the partial surface by the additive manufacturing device with a surface texture that is defined by the set of target texture parameter values, wherein either the existing control command set is determined as the control command set for manufacturing the three-dimensional object that is assigned to the set of existing texture parameter values identified in the comparison step, or, if the existing control command set includes only the control commands that geometrically describe the surface texture characterized by the identified set of existing texture parameter values, integrating the control commands into a complete control command set.

2. A computer-based method according to claim 1, further comprising determining a set of interaction parameter values having a number of components, wherein a value for an interaction parameter is assigned to each component and an interaction parameter characterizes an interaction of the at least one partial surface of the object to be manufactured with a surrounding of the at least one partial surface of the object to be manufactured.

3. A computer-based method according to claim 1, further comprising assigning interaction parameter values to the components of the set of interaction parameter values via a user input.

4. A computer-based method according to claim 1, further comprising optimizing the set of interaction parameter values based on a user input and/or an automatic optimization algorithm before the comparison with the sets of existing interaction parameter values.

5. A computer-based method according to claim 1, wherein after the set of existing interaction parameter values having values that are the least different to the set of interaction parameter values has been identified, the identified set of existing interaction parameter values is subjected to an optimization procedure based on a user input and/or an automatic optimization algorithm and the comparison set is again executed with the resulting set of interaction parameter values.

6. A computer-based method according to claim 1, wherein the set of interaction parameter values and the sets of existing interaction parameter values each have more than one component and the difference of a set of existing interaction parameter values to the set of interaction parameter values is determined based on a metric defined by weighting the components that involve a user input.

7. A computer-based method according to claim 1, wherein the components of the interaction parameter sets contain values for at least one of the following interaction parameters:

an interaction parameter that characterizes an interaction of the surface texture with a fluid flowing in contact with the surface texture, the interaction parameter being the frictional resistance and/or an ability to repel water and/or noise;

an interaction parameter that characterizes a haptics of the surface; and an interaction parameter that characterizes a reflection characteristic of the surface.

8. A preprocessor device for carrying out a method of providing control commands for an additive manufacturing device, the preprocessor device comprising:

an allocation processor component that allocates input data representing at least a partial surface of an entire surface of the three-dimensional object to be manufactured, wherein the partial surface has an initial surface texture that is defined by a set of initial texture parameter values that characterize a geometry of the initial surface texture, wherein the input data includes a set of preferential texture parameter values that characterize a preferential surface texture of the partial surface;

a comparing processor component that compares the set of preferential texture parameter values with different sets of existing texture parameter values and determines a set of existing texture parameter values by the step of comparing the set of preferential texture parameter values with the different sets of existing texture parameter values which is a set of target texture parameter values having values that are the least different to the set of preferential texture parameter values;

an assignment processor component that assigns an existing control command set of an additive manufacturing device to each of the sets of existing texture parameter values to manufacture the partial surface by the additive manufacturing device with a surface texture that is defined by the corresponding set of existing texture parameter values; and a control command set generation processor component that, when in operation, generates control commands of a control command set to manufacture the partial surface by the additive manufacturing device with a surface texture defined by the set of target texture parameter values, wherein either the existing control command set is determined as the control command set for manufacturing the three-dimensional object that is assigned to the set of existing texture parameter values identified in the comparison step, or, if the existing control command set includes only the control commands that geometrically describe the surface texture characterized by the identified set of existing texture parameter values, integrating the control commands into a complete control command set.

9. A method of manufacturing a three-dimensional object by an additive manufacturing device, comprising at least the following steps:
provided control commands of a control command set by a method according to claim 1; and
manufacturing the three-dimensional object by the additive manufacturing device based on the provided control commands.

10. An apparatus for carrying out an additive manufacturing method, comprising a preprocessor device according to claim 8 or wherein the apparatus is connected to the preprocessor device according to claim 8 such that the apparatus may communicate via a signal with the preprocessor device.

11. A computer program comprising a command sequence for carrying out a method according to claim 1.

12. A computer program including a command sequence carried out in a device according to claim 8.

13. A computer program including a command sequence carried out in a device according to claim 10.

14. A computer-based method of providing control commands of a control command set for manufacturing a three-dimensional object by an additive manufacturing device, wherein the method comprises at least the following steps:
allocating input data representing at least a partial surface of an entire surface of the three-dimensional object to be manufactured, wherein the partial surface has an initial surface texture defined by a set of initial texture parameter values that characterize a geometry of the initial surface texture determining a set of interaction parameter values having a number of components, wherein a value for an interaction parameter is assigned to each component and an interaction parameter characterizes an interaction of the at least one partial surface of the object to be manufactured with a surrounding of the at least one partial surface of the object to be manufactured;
comparing the set of interaction parameter values with different sets of existing interaction parameter values and of determining a set of existing interaction parameter values by the step of comparing the set of preferential texture parameter values with the different sets of existing texture parameter values that are the least different to the set of interaction parameter values;
assigning a set of texture parameter values to each set of existing interaction parameter values;
assigning an existing control command set of an additive manufacturing device to each of the sets of existing interaction parameter values to manufacture the partial surface by the additive manufacturing device with a surface texture that is defined by the set of texture parameter values assigned to the set of existing interaction parameter values; and
generating control commands for a control command set, in that the existing control command set that is assigned to the set of existing interaction parameter values identified in the comparison step, either is set as control command set for manufacturing the object or, when the existing control command set includes only those control commands that geometrically describe the surface texture characterized by the set of texture parameter values which is assigned to the set of existing interaction parameter values identified in the comparison step, integrating the control commands into a complete control command set.

15. The computer-based method according to claim 14, wherein the input data includes a set of preferential texture parameter values that characterize a preferential surface texture of the partial surface.

* * * * *